Feb. 28, 1939.  P. L. SCOTT  2,148,652
METHOD OF MAKING CONNECTIONS
Filed Aug. 19, 1935
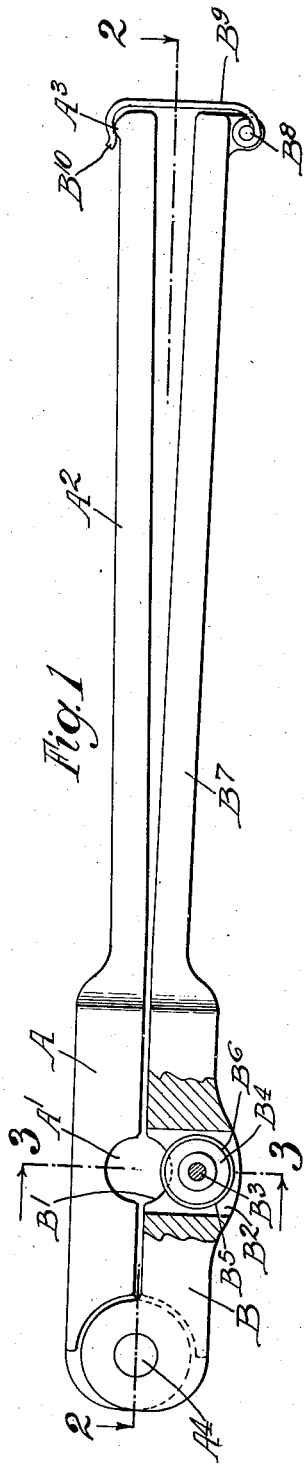
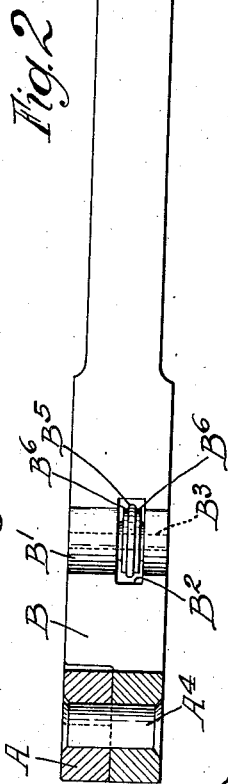
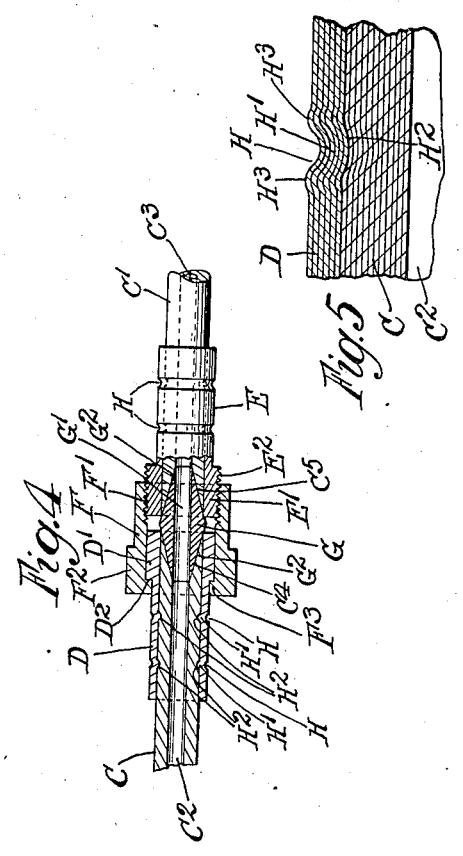
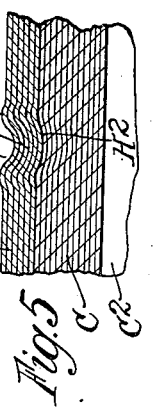
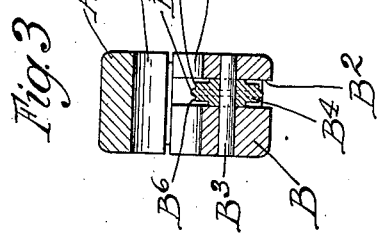
Inventor
Philip Lane Scott
by Parker & Carter.
Attorneys.

Patented Feb. 28, 1939

2,148,652

UNITED STATES PATENT OFFICE 2,148,652

METHOD OF MAKING CONNECTIONS

Philip Lane Scott, Chicago, Ill., assignor to Super Diesel Tractor Corporation, La Porte, Ind., a corporation of New York Application August 19, 1935, Serial No. 36,880

3 Claims. (Cl. 29—157)

This invention relates to a method of attaching a coupling member. One object is to provide a ready and inexpensive method for attaching a coupling member to a pipe so that the coupling member cannot be withdrawn or displaced from the pipe and so that the pipe itself receives a minimum of distortion. Another object is to provide means of attaching a coupling member to a pipe without the use of soldering, brazing or other equivalent attaching means. Another object is to provide a tool for effecting the attachment.

Other objects will appear from time to time in the specification and claims. My invention is illustrated more or less diagrammatically in the accompanying drawing, wherein:

Figure 1 is a side elevation of the tool, with parts broken away and parts in section;

Figure 2 is a longitudinal cross section of the tool, taken at line 2—2 of Figure 1;

Figure 3 is a transverse cross section of the tool, taken at line 3—3 of Figure 1;

Figure 4 is a longitudinal section with parts in elevation, showing one form of a coupling in which the coupling members are attached to the tubes according to my method; and Figure 5 is a sectional diagrammatic detail.

Like parts are designated by like characters throughout the specification and drawing.

A tool is formed with a head member A, having a generally semi-cylindrical depression A1 in it. It is provided with an elongated handle A2 which may have a raised portion A3 on its top or outside, adjacent its free end.

The head portion A is hinged by a hinge member A4 to a co-operating head portion B which has a generally semi-cylindrical depression B1 in its inner face, placed opposite the depression A1. The head A also has an opening or depression B2 formed in it and preferably extending through it. A shaft member B3 extends through the opening B2 and carries a roller B4 which roller has a central rounded raised portion B5 and it may have on either side of this raised portion a pair of generally flat portions B6, B6. Preferably formed integrally with the head B is a handle portion B7 which carries at its outer end a hinge member B8 upon which is hinged a clasp B9 which has an engaging portion B10 arranged to engage the member A3 of the handle A2. The clasp member B9 is preferably of spring material, so that it may be sprung over the projection A3 and it is preferably of such length that when it is sprung over the handle, as shown in Figure 1, it limits and positions the two handles and the two head portions so that they are separated from each other a suitable distance for use.

In Figure 4 the coupling is shown as applied to a pair of pipe sections C, C1, having bores C2, C3, respectively. These are outwardly tapered or counterbored as at C4, C5. Fitted upon the pipe section C is an end or coupling member D, which is enlarged as at D1 and provided with a shoulder D2 separating the portions D and D1.

The pipe section C1 has mounted upon it an end or coupling member E which is enlarged as at E1 and preferably exteriorly threaded as at E2.

A collar F, interiorly threaded as at F1 and provided with an enlarged portion F2, is preferably positioned to engage the sections D and E. The enlarged portion F2 is preferably of angular cross section to enable it to be engaged by a tool and it is provided with an inwardly facing annular flange portion F3, arranged to engage the shoulder D2.

A thimble G, having a bore G1, preferably of the same size as the bores C2, C3 and preferably symmetrically exteriorly tapered as at G2, G2, is placed with one end in each of the open tapered ends of the pipe sections C, C1. When the collar F, F2 is manipulated to draw the coupling members D and E together, the thimble G is held in place and under some circumstances is compressed. The sections D and E may be forced together sufficiently to pinch outward a fin or flange, not shown, about the thimble. This, if formed, will normally extend out from the widest portion of the thimble. The parts may, however, be so dimensioned that when they occupy the position shown in Figure 4, an adequate seal is formed without the formation of any such outwardly extending fin or flange.

I shall now describe the method of fastening the end members D and E to the pipe C, C1. There are many methods of doing this but it is preferable to provide a positive method by means of which the user can readily fasten the end section to the pipe with certainty that he has made an adequate and permanent fastening. It is important, also, that the fastening leave the interior wall of the pipe as nearly undisturbed as possible, so that no distortion or constriction is provided within the bore of the pipe and thus no obstacle is set up to interfere with the passage of fluid through the pipe. In this invention the method of attachment comprises the formation of one or more depressions H in the exterior of the end members D and E. These depressions may be of any shape but will ordinarily be formed as grooves extending about the end members. The depressions may be preferably formed partly by distorting the tubular portion of the members D and E and partly by actually pushing aside some of the metallic fibers and thus the corresponding inner projection H1, formed for each of the depressions H, is of less size than the depression. In other words, the height of the projection H1 is less than the depth of the depression H. A corresponding depression H2 is formed in the exterior of the tubes C and C1, for each of the inner projections H1. The depressions H2 may be formed with practically no corresponding projection in the bore of the tube, the depression H2 being formed largely by the forcing aside or displacing of the metal rather than by the forcing inwardly of the metal, and thus the inward projections H1 penetrate into depressions H2 and the pipe section is fastened securely and permanently to the end member without distortion of the inner walls of the bore of the pipe. Thus the resultant coupling provides a substantially uniform bore from pipe section to pipe section which is uninterrupted and undistorted and unchanged in shape or size throughout the length of the pipes and also throughout the length of the coupling or thimble member G. The end members D, D1 and E, E1 and the collar F form the structural members which carry the general structural load, and the thimble member G acts as a sealing member and carries substantially none of the structural load but carries all of the internal fluid load. Pressure within and exerted upon the thimble forces it outward against the tapered portions of the bores of the pipes and thus the thimble is forced against the pipes with a sealing contact and leakage is prevented and the structural members which actually carry the strain form no part of the fluid system since they are not in contact with the fluid.

In forming the coupling, the parts are assembled more or less as shown in Figure 4, but the end members D and E are, of course, not yet fastened to the pipe sections. The tool shown in the first three figures is placed about either of the end sections and the two handle portions A2 and B7 are drawn together, the pipe and end section being positioned within the generally cylindrical portion formed by the depressions A1 and B1 and engaging the roller B4. The handles A2 and B7 are preferably moved together until the member B10 may be snapped over the projection A3, as shown in Figure 1. These parts are preferably so proportioned that when they are in the position shown in Figure 1, the right amount of compression is exerted upon the pipe and coupling to form an initial depression. The tool is then rotated so that the roller is moved completely about the end section and the depressions shown in Figure 4 are thus formed. As many such depressions as are desired may be formed. As a rule, two for each coupling member are sufficient. As shown in Figure 4, there are two for each end member.

In Figure 5 there is shown an enlarged sectional diagram illustrating the metal flow resulting upon the formation of one of the depressions or grooves H. The corresponding projection H1 on the interior of the member D is shown penetrating into the depression H2 on the tube C. Lines have been drawn to illustrate diagrammatically the fibrous structure of the metal. The figure shows graphically that the projections and depressions are formed by actual flow of material rather than by the complete deformation of the parts.

As shown in Figure 5 on each side of the depression H projections or ridges H3 are formed. This is the result of the flowing of the metal away from the tool which forms the depression H. Corresponding flow occurs on the other parts which are affected by the formation of the depressions and the projection. It will be understood, of course, that sometimes there is some deformation even on the interior of the pipes.

Thus some projection may appear in the pipe bore C2. Normally this does not occur.

While ordinarily the tool is provided with a latch member B9 which establishes the relative positioning of the two parts of the tool, this might be omitted or it might be made adjustable to provide for different positioning so that the tool might be used upon couplings of different size. The showing of the depressions and projections in the coupling is exaggerated. Actually they are much smaller in proportion to the size of the pipe and end members than is shown in the drawings. For purposes of clearness it has been necessary to exaggerate their size.

A modification of the method of making the attachment of the sleeve D to the pipe or tube C includes the step of forming in the exterior of the pipe C one or more depressions. These may be formed by cutting or otherwise so that they are formed on the exterior of the pipe before the sleeve portion D or E is positioned upon it. Thus where the depressions are formed in the pipe itself directly and the pipe is thereafter inserted into a member D or a member E, the member D or E is acted upon by the tool and the depression H and corresponding projection H1 formed in the same manner as that described above by the tube C is not deformed as the projection H1 when it is formed, merely extends into an already formed depression in the exterior of the tube C.

I claim:

1. The method of making a fluid tight joint between a metallic connector sleeve and a metallic pipe end, which comprises the steps of fitting the sleeve snugly upon the pipe, forming a depression in the exterior of the sleeve and thereby displacing the metal of the sleeve and producing a protrusion upon the inner wall of the sleeve which in turn produces a depression upon the outer wall of the pipe, causing the sleeve to grip the pipe and maintaining the internal diameter or surface of the pipe substantially undeformed, and sealing the joint between the pipe and sleeve against fluid pressure by expanding the wall of the pipe outwardly into fluid-tight engagement with the wall of the sleeve.

2. The method of making a metallic tubing connection which comprises the steps of fitting a connector sleeve snugly upon and in contact with said tubing at its end, forming an indentation in said sleeve at a point separated from its end, forming a corresponding indentation in the outer wall of said tube while maintaining the said bore within said tube substantially unaltered, associating together a pair of such tube and sleeve combinations, positioning in the open end of each tube one end of a single sealing member and drawing said tube and sleeve assemblies together.

3. The method of making a metallic tubing connection which comprises the steps of fitting a connector sleeve snugly upon and in contact with said tubing at its end, forming an indentation in said sleeve at a point separated from its end, forming a corresponding indentation in the outer wall of said tube while maintaining the said bore within said tube substantially unaltered, associating together a pair of such tube and sleeve combinations, counterboring said bore at the open end of each tube, positioning in the open end of each tube one end of a single sealing member, shaped to correspond to said counterbored ends, and drawing said tube and sleeve assemblies together.

PHILIP LANE SCOTT.